US009489792B1

(12) United States Patent
Buchholz et al.

(10) Patent No.: US 9,489,792 B1
(45) Date of Patent: Nov. 8, 2016

(54) MANAGING GAMING DATA RULE SETS AND COMMUNICATIONS

(75) Inventors: Dale R. Buchholz, Palatine, IL (US); Magesh Gangadharan, Des Plaines, IL (US); Jamie W. Vann, Chicago, IL (US); Matthew J. Ward, Northbrook, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 788 days.

(21) Appl. No.: 13/289,562

(22) Filed: Nov. 4, 2011

Related U.S. Application Data

(60) Provisional application No. 61/410,221, filed on Nov. 4, 2010.

(51) Int. Cl.
*A63F 13/00* (2014.01)
*G07F 17/32* (2006.01)

(52) U.S. Cl.
CPC ........... *G07F 17/32* (2013.01); *G07F 17/3232* (2013.01)

(58) Field of Classification Search
USPC .......................................................... 463/25
See application file for complete search history.

(56) References Cited

U.S. PATENT DOCUMENTS

2003/0114220 A1* 6/2003 McClintic ....................... 463/25
2009/0054136 A1 2/2009 Gagner et al.
2009/0156299 A1 6/2009 Anderson et al.
2010/0016056 A1* 1/2010 Thomas et al. ................. 463/20
2010/0016071 A1* 1/2010 Jaffe et al. ...................... 463/27
2010/0124983 A1 5/2010 Gowin et al.
2010/0317424 A1* 12/2010 Hornik et al. .................. 463/20
2010/0317442 A1 12/2010 Thomas et al.
2010/0323785 A1 12/2010 Motyl et al.
2012/0004026 A1* 1/2012 Vann .............................. 463/25

FOREIGN PATENT DOCUMENTS

WO WO2008063349 5/2008
WO WO2008108780 9/2008

OTHER PUBLICATIONS

Cisco, "White Paper", *Working with Device Fault Manager Polling and Threshold Manager* Feb. 2010 , 19 pages.
Gaming Standards Association, "eventHandler", *Clarifications to G2S From V1.0.3 to V2.0.3 Game to System* Chapter 4 Oct. 23, 2009, pp. 50-62.

(Continued)

*Primary Examiner* — Masud Ahmed
(74) *Attorney, Agent, or Firm* — DeLizio Law, PLLC

(57) ABSTRACT

A wagering game system and its operations are described herein. In some embodiments, the operations can include accumulating data for a plurality of events that a first application generates during a wagering game session from a plurality of wagering game sessions associated with a wagering game player account. The operations can further include detecting that occurrence of at least one of the plurality of events would cause a second application to award a level of progress in a persistent-state game. A state of the persistent-state game is persisted across the plurality of the wagering game sessions for the wagering game player account. The operations can further include providing the data to the second application, after the occurrence of a trigger, such as in response to determining the at least one of the plurality of events would cause the second application to award the level of progress in the persistent-state game.

24 Claims, 9 Drawing Sheets

(56) References Cited

OTHER PUBLICATIONS

Gaming Standards Association, "eventHandler", *Clarifications to G2S From V1.0.3 to V2.0.3 Game to System* Chapter 4 Mar. 25, 2010 , pp. 70-82.
Gaming Standards Association, "eventHandler Class", *G2S Message Protocol V1.0.3 Gane System* Chapter 4 Apr. 12, 2007 , pp. 155-198.
Gaming Standards Association, "eventHandler Class", *G2S Message Protocol V2.0.3 Game To System* Chapter 4 Oct. 16, 2009 , pp. 317-382.
Gaming Standards Association, "meters", *Clarifications to G2S From V1.0.3 to V2.0.3 Game to System* Chapter 5 Oct. 23, 2009 , pp. 83-90.
Gaming Standards Association, "meters", *Clarifications to G2S From V1.0.3 to V2.0.3 Game to System* Chapter 5 Mar. 25, 2010 , pp. 83-90.
Gaming Standards Association, "meters Class", *G2S Message Protocol V1.0.3 Game To System* Apr. 12, 2007 , pp. 199-238.
Gaming Standards Association, "meters Class", *G2S Message Protocol V2.0.3 Game To System* Chapter 5 Oct. 16, 2009 , pp. 383-444.
Gaming standards Association, "player", *Clarifications to G2S From V1.0.3 to V2.0.3 Game To System* Chapter 20 Oct. 23, 2009, pp. 175-187.
Gaming Standards Association, "player", *Clarifications to G2S From v1.0.3 to V2.0.3 Game to System* Chapter 20 Mar. 25, 2010 , pp. 175-187.
Gaming Standards Association, "player Class", *G2S Message Protocol V2.0.3 Game to System* Chapter 20 Oct. 16, 2009 , pp. 1309-1412.
Gaming Standards Association, "player Class", *G2S Message Protocol V1.0.3 Game to system* Chapter 20 Apr. 12, 2007 , pp. 813-884.

* cited by examiner

MANAGING GAMING DATA RULE SETS AND COMMUNICATIONS

RELATED APPLICATIONS

This application claims the priority benefit of U.S. Provisional Application Ser. No. 61/410,221 filed Nov. 4, 2010.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

TECHNICAL FIELD

Embodiments of the inventive subject matter relate generally to wagering game systems and networks that, more particularly, manage gaming data and communications.

BACKGROUND

Wagering game machines, such as slot machines, video poker machines and the like, have been a cornerstone of the gaming industry for several years. Traditionally, wagering game machines have been confined to physical buildings, like casinos (e.g., resort casinos, road-side casinos, etc.). The casinos are located in specific geographic locations that are authorized to present wagering games to casino patrons. However, with the proliferation of interest and use of the Internet, shrewd wagering game manufacturers have recognized that a global public network, such as the Internet, can reach to various locations of the world that have been authorized to present wagering games. Any individual with a personal computing device (e.g., a personal computer, a laptop, a personal digital assistant, a cell phone, etc.) can connect to the Internet and play wagering games. Some wagering game manufacturers have begun to integrate wagering games with websites, such as social network websites or proprietary websites that cater to wagering game enthusiasts. However, wagering game manufacturers are constantly interested in creating new and interesting ways of integrating wagering games into the websites and increasing customer loyalty and satisfaction.

BRIEF DESCRIPTION OF THE DRAWING(S)

Embodiments are illustrated in the Figures of the accompanying drawings in which.

DESCRIPTION OF ILLUSTRATIVE EMBODIMENTS

Figure 1:
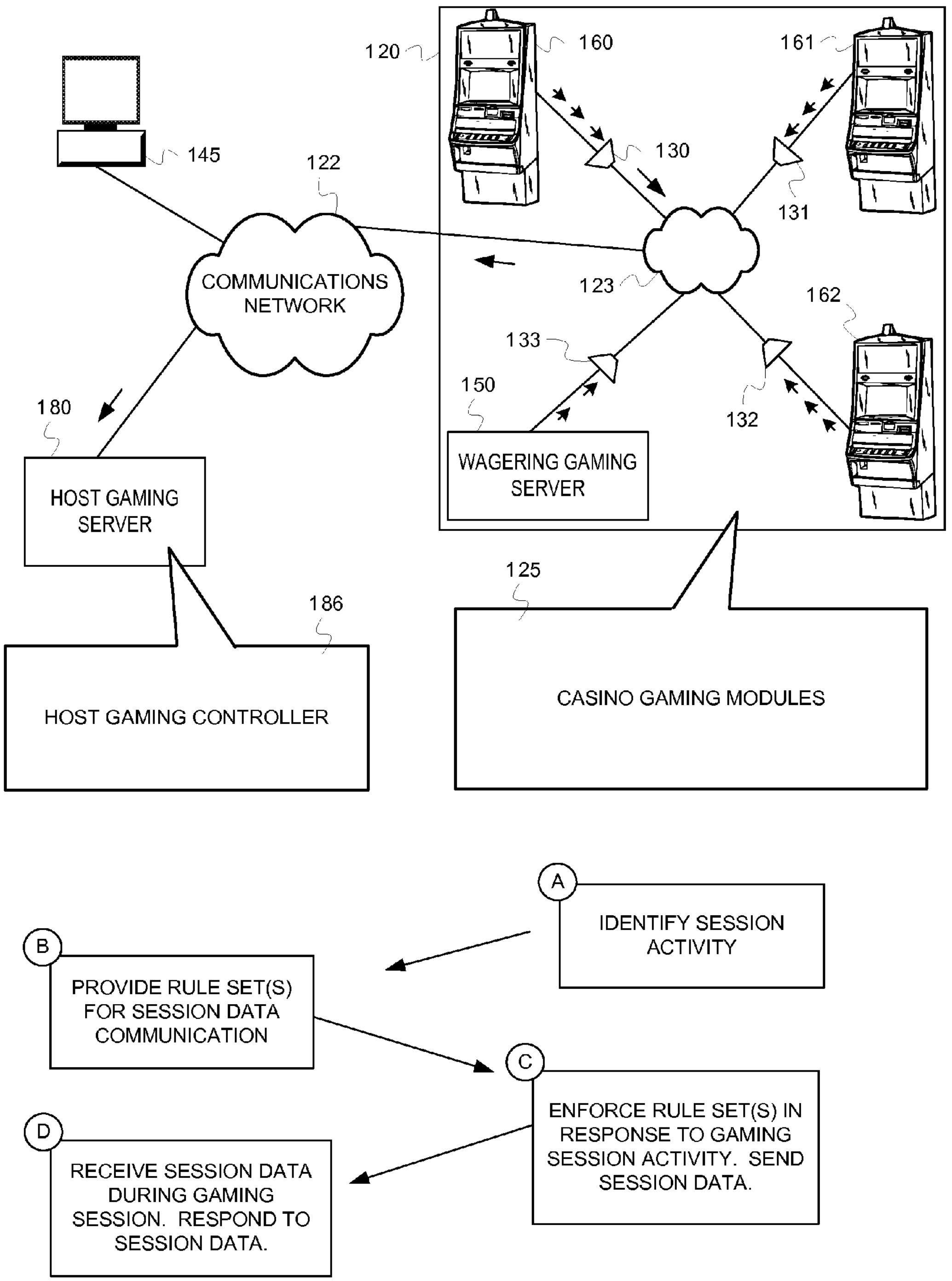
FIG. 1 is an illustration of processing rule sets for gaming communications during a wagering game session, according to some embodiments.

This description of the embodiments is divided into six sections. The first section provides an introduction to embodiments. The second section describes example operating environments while the third section describes example operations performed by some embodiments. The fourth section describes additional example embodiments while the fifth section describes additional example operating environments. The sixth section presents some general comments.

Introduction

This section provides an introduction to some embodiments.

As indicated previously, some wagering game manufacturers are interested in integrating wagering games and websites. Some wagering game manufacturers are interested in creating ways for host devices that host websites and other online gaming venues to share information with wagering game machines, wagering game servers, and/or other devices in a casino. However, wagering game manufacturers face challenges communicating data between the casino devices and the host device. Data traffic can cause a lag in application responsiveness on the wagering game machines and/or wagering game servers, diminishing a casino patron's gaming experience.

Some embodiments of the inventive subject matter include rule sets (e.g., filters, configurations, etc.) that control data communications between host devices and casino devices. In some embodiments the rules sets are, or include, filters that can intelligently control and manage data communications during a gaming session between a host device and a casino device. In some embodiments, when a casino device runs a wagering game application, the wagering game application generates session data, such as betting events, game outcome events, etc. A filter, according to some embodiments, can accumulate session data, during the gaming session, without sending it to the host device. The filter can determine when one or more triggers (e.g., indications of achievements, conditions, degrees of wagering activity, etc.) occur in the wagering game application, during the gaming session, that would cause specific events (e.g., achievements, conditions, degrees of progress, etc.) to occur in a game, or other application, controlled by the host device. When the one or more triggers occur on the casino device, the filter can transmit accumulated session data to the host device. The host device can immediately respond to the session data during the gaming session. For example, the host device can immediately notify a player that a substantial advancement in a host game occurs (e.g., a completion of a milestone, a completion of a scavenger hunt game goal, an award of a virtual trophy in a persistent-state game, etc.). The casino device can detect player response to the notification and immediately communicate the player response to the host device. The host device can respond to the player response, and so forth, throughout the gaming session. The communications and responses by the host device and the casino devices may be referred to as interactive or adaptive gaming.

FIG. 1 is a conceptual diagram that illustrates an example of processing rule sets for gaming data during a wagering game session, according to some embodiments. In FIG. 1 a host gaming server 180 is connected, via a communications network 122, to a casino network 123. One or more casino devices (e.g., wagering game machines 160, 161, and 162, and wagering game server 150) are connected to the casino network 123 at a casino 120. Casino gaming modules 125 may be included in, or associated with, for example, the wagering game machines 160, 161, and 162, and/or the wagering game server 150. The casino gaming modules 125 can also, or instead, be associated with applications that run on any one of the wagering game machines 160, 161, and 162 and/or the wagering game server 150. Each of the wagering game machines 160, 161, and/or 162, and the wagering game server 150 can initiate, or track, one or more gaming sessions and run one or more wagering game computer programs ("wagering games") associated with the gaming sessions. The host gaming server 180 can include a host gaming controller 186. The host gaming server 180 can provide content (e.g., non-wagering games, social networking content, etc.) to one or more devices outside of the casino 120, such as to a computer 145. A player can log in to the computer 145 while away from the casino 120 and access the content provided by the host gaming server 180.

At stage "A," one or more of the casino gaming modules 125 identify that session activity has begun or is in progress via any one or more of the wagering game machines 160, 161, and 162 or the wagering game server 150. The casino gaming modules 125 can send messages to the host gaming controller 186. Each of the messages can indicate that a gaming session has begun and identify a player account associated with the gaming session (i.e., a player account associated with a player that has logged in to any of the wagering game machines 160, 161, or 162).

At stage "B," after the host gaming controller 186 receives the indications of the start of the gaming sessions from the casino gaming modules 125, the host gaming controller 186 identifies the player accounts associated with the gaming sessions and identifies any host-level computer programs integrated with the wagering game computer programs run at the casino level. The wagering game computer programs ("wagering games") can be run by any of the wagering game machines 160, 161, or 162 and/or the wagering game server 150. The host-level computer programs can be, for example, persistent-state game applications ("persistent state games"). A persistent-state game has goals which can be attained via cumulative play from the wagering games. However, the persistent-state game is separate from the wagering game with separate rules, code, etc. A state of a persistent-state game is stored, or persisted, across multiple wagering game sessions. A persistent-state game can also have separate themes from the wagering games. The wagering games can be played in a casino setting (e.g., via the wagering game machines 160, 161, or 162), or via other wagering venues (e.g., via an online casino). The wagering games are related to, or somehow integrated with, the persistent-state games run by the host gaming server 180. The host gaming controller 186 causes advancement in the persistent-state game based on triggers from the wagering games. Depending on the rules of the persistent-state games, the triggers from the wagering games can result in various degrees of progress in the persistent-state games.

The host-level computer programs that run on the host gaming server 180 (e.g., the persistent-state games) may utilize session data for various reasons. For example, a persistent-state game application can utilize session data to cause progress in a persistent-state game. For example, the host gaming controller 186 can use the session data to add, or advance, progress indicators (e.g., points) to persistent-state games. The session data can pertain to the wagering game machines 160, 161 and 162, the wagering game server 150, the casino gaming modules 125, the player accounts, the wagering games, or any other information provided by the wagering game computer programs and/or associated with the gaming sessions. For example, the session data can include login data, bet amounts, number of game plays, denomination values, game outcomes, best wins, gaming accomplishments, etc.

Further, the host gaming controller 186 ascertains rule sets related to the host-level computer programs. The rule sets include rules that govern communication of the session data (e.g., timing of data transmissions, amounts of data transmitted, types of data transmitted, etc.) between the host gaming controller 186 and the casino gaming modules 125.

Also at stage "B," the host gaming controller 186 determines current states of the host-level computer programs as they pertain to the player accounts. For instance, the host gaming controller 186 may determine a current state of a persistent-state game for which a player account has previously registered (e.g., via a website) and/or which the player has begun playing. The host gaming controller 186 indicates to the casino gaming modules 125 the states of the persistent-state games. The information about the current states of the host-level computer programs that the host gaming controller 186 provides to the casino gaming modules 125 may be referred to as state data. An example of state data may include a total number of progress points that a player account has achieved since registering for or beginning play of a persistent-state game.

At stage "C," the casino gaming modules 125 receive the rule sets and state data provided by the host gaming controller 186. The casino gaming modules 125 enact, or begin to enforce, the rule sets. The rule sets can specify communication rules between the casino gaming modules 125 and the host gaming controller 186. Some of the rules govern scheduling, timing, accumulation, and transmission of session data as it occurs during the session and/or in response to gaming session activity. The rules can also refer to state data. For instance, the rule sets can be, or can include, filters (e.g., filter 130, 131, 132, and 133) that accumulate session data for each game play (e.g., accumulates bet amounts and results for each spin of slot games) and waits until triggers occur as specified in the rules. The triggers specify when to send accumulated session data (e.g., a set or collection of accumulated data). For example, a portion of each wager or a given outcome for a wagering game may equate to a persistent-state game goal (e.g., a specific number of points that equates to a milestone or achievement in the persistent-state game). The casino gaming modules 125 can, individually, track an amount of points earned for any of the persistent-state games as the triggers occur during the gaming sessions. The casino gaming modules 125 can compare the amount of points earned with an initial point value provided by the host gaming controller 186 in the state data for the player accounts. The rules may specify an accumulation level at which the casino gaming modules 125 should report the accumulated session data to the host gaming controller 186. For example, the rules may specify that when the point total is a certain number of points away from a threshold value then the casino gaming modules 125 should transmit accumulated data, and/or begin frequent periodic transmittals of session data (e.g., transmit session data after each spin) until the threshold value is reached (e.g., until the persistent-state game goal is attained). For example, a player logged in to the wagering game machine 160 has an initial point total in a persistent-state game of 800 points, as specified by state data provided by the host gaming controller 186 at stage "B." A filter 130 provided to wagering game machine 160 specifies that an occurrence of a 1000-point threshold value would result in a next milestone or game goal in the persistent-state game. At the 1000-point threshold level, the host gaming controller 186 may award a prize for the persistent-state game associated with the milestone or game goal. The filter 130 may specify that, during the game session, when the point total is 50 points away from the 1000-point threshold value, then one of the casino gaming modules 125 associated with the wagering game machine 160 should submit all accumulated spin data and begin transmitting spin data after each spin. By using the filter 130, a specific one of the casino gaming modules 125 for the wagering game machine 160, thus, provides the session data to the host gaming controller 186 only when the host gaming controller 186 needs to advance the persistent-state game to a significant level or progress or to provide an award to the player account.

The other casino gaming modules 125 for the wagering game machines 161 and 162 and for the wagering game server 150 can also, via the filters 131, 132, and 133, accumulate data and only send it when appropriate for triggers relevant to the gaming sessions for players accounts associated with the wagering game machines 161 and 162 and/or with the wagering game server 150. For example, the wagering game server 150 can, via one of the casino gaming modules 125, accumulate session data from wagering game programs run by the wagering game machines 160, 161, and 162 and other wagering game machines throughout a casino. In some embodiments, one of the casino gaming modules 125 for the wagering game server 150 may be a proxy for others of the casino gaming modules 125 associated with the wagering game machines 160, 161, and 162.

At stage "D," the host gaming controller 186 receives the session data during the game session. The host gaming controller 186 can respond to the session data with additional or updated information based on the session data. For example, the host gaming controller 186 can provide updated rule sets, with updated filters or filter settings, that the casino gaming modules 125 can utilize to schedule the accumulation, scheduling, and transmission of session data according to further triggers relevant to the host-level computer programs. For instance, when the point total for the one of the player's instance of the persistent-state game reaches the 1000-point threshold value, the host gaming controller 186 can provide a virtual trophy as a reward. The awarding of the virtual trophy may initiate an additional phase of the persistent-state game for the player account. The additional phase may have a different point gradation for attaining goals, milestones, etc. than the previous phase. The host gaming controller 186 can provide, to the specific one of the casino gaming modules 125 associated with the wagering game machine 160, an updated rule set that is specific to the additional phase of the instance of the persistent-state game.

It should be noted that managing communications of gaming data according to rules can be used for many types of gaming applications, conditions, content types, etc., not only for data related to persistent state games (PSGs). However, for simplicity, PSG type data is one type of gaming content that is used in multiple examples described above and below. Further, some embodiments of the inventive subject matter describe examples of managing gaming data in a network wagering venue (e.g., an online casino, a wagering game website, a wagering network, etc.) using a communication network, such as the communications network 122 in FIG. 1. Embodiments can be presented over any type of communications network that provides access to wagering games, such as a public network (e.g., a public wide-area-network, such as the Internet), a private network (e.g., a private local-area-network gaming network), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

Further, in some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
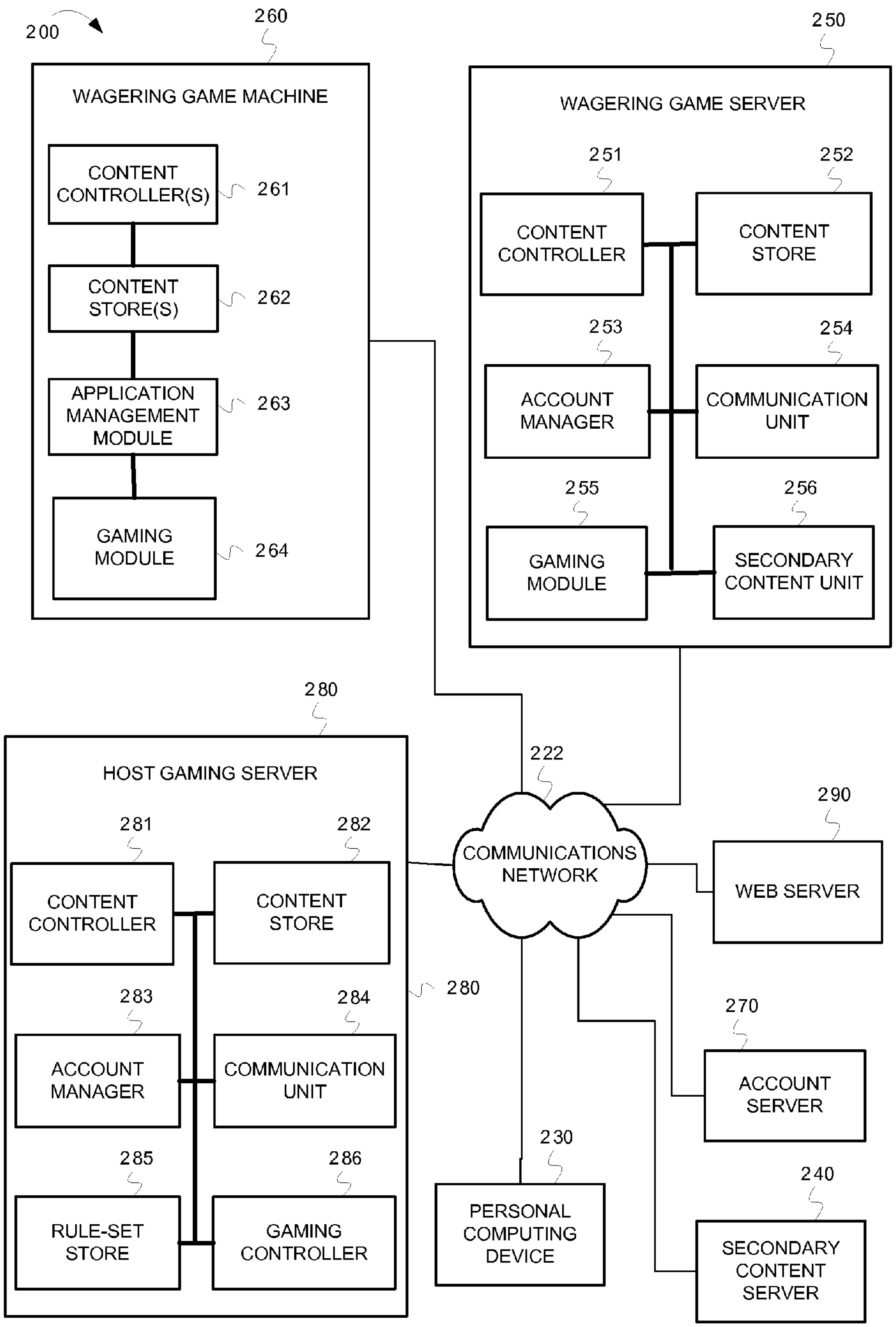
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networking networks. The account server 270 can store wagering game player account information, such as account settings (e.g., settings related to sever-based/host-level games, settings related to adaptive games, settings related to persistent-state games, settings related to social contacts, etc.), preferences (e.g., player preferences regarding online gaming venues, preferences related to game themes, preferences related to persistent-state games. etc.), player profile data (e.g., name, avatar, screen name, etc.), and other information for a player's account (e.g., financial information, account identification numbers, virtual assets, social contact information, etc.). The account server 270 can contain lists of social contacts referenced by a player account. The account server 270 can also provide auditing capabilities, according to regulatory rules. The account server 270 can also track performance of players, machines, and servers.

The wagering game system architecture 200 can also include a wagering game server 250 configured to control wagering game content, provide random numbers, and communicate wagering game information, account information, and other information to and from a wagering game machine 260. The wagering game server 250 can include a content controller 251 configured to manage and control content for the presentation of content on the wagering game machine 260. For example, the content controller 251 can generate game results (e.g., win/loss values), including win amounts, for games played on the wagering game machine 260. The content controller 251 can communicate the game results to the wagering game machine 260. The content controller 251 can also generate random numbers and provide them to the wagering game machine 260 so that the wagering game machine 260 can generate game results. The wagering game server 250 can also include a content store 252 configured to contain content to present on the wagering game machine 260. The wagering game server 250 can also include an account manager 253 configured to control information related to player accounts. For example, the account manager 253 can communicate wager amounts, game results amounts (e.g., win amounts), bonus game amounts, etc., to the account server 270. The wagering game server 250 can also include a communication unit 254 configured to communicate information to the wagering game machine 260 and to communicate with other systems, devices and networks. The wagering game server 250 can also include a gaming module 255 configured to receive and enforce rules sets that control communication and/or other interactions between wagering game programs run by the wagering game server 150 and programs run by a host gaming server 280. The wagering game server 250 can also include a secondary content unit 256 configured to control secondary content related to wagering games. For example, the secondary content unit 256 can integrate with the secondary content server 240 to provide secondary wagering games to the wagering game machine 260.

The wagering game system architecture 200 can also include the wagering game machine 260 configured to present wagering games, process wagering game information, instructions, and data, and receive and transmit information to manage gaming data. The wagering game machine 260 can include one or more content controller(s) 261 configured to manage and control content and presentation of content on the wagering game machine 260. The wagering game machine 260 can also include one or more content store(s) 262 configured to contain content to present on the wagering game machine 260. The content controller(s) 261 and content store(s) 262 can, for example, control and store content for a primary, or base wagering game, and one or more secondary wagering games and/or one or more secondary content applications (e.g., chat, leader boards, media players, etc.). The wagering game machine 260 can also include a secondary content client configured to present secondary content applications (e.g., client player instances). The wagering game machine 260 can further include an application management module 263 configured to manage communications between a primary game application and secondary content applications. The application management module 263 can further be configured to manage (e.g., aggregate, publish, route, convert, etc.) communication and interpretation of events between applications, services, components, etc. of the wagering game machine 260 and other devices associated with and/or external to the wagering game machine 260. For instance, the application management module 263 can communicate event data to and from one or more secondary content client environments (e.g., an Adobe® Flash® Player, a Microsoft® Silverlight® Player, etc.), a primary wagering game application, and the wagering game server 250. The application management module 263 can further be configured to manipulate and control windows, or other user interfaces, presented on displays of the wagering game machine 260. The application management module 263 can also be configured to control and communicate account information (e.g., financial transactions, player tracking information, etc.) between the wagering game machine 260 the account server 270, the wagering game server 250, and/or the host gaming server 280. The wagering game machine 260 can also include a gaming module 263 configured to receive and enforce rules sets that control communication and/or other interactions between wagering game programs run by the wagering game machine 160 and programs run by a host gaming server 280.

The wagering game system architecture 200 can also include a web server 290 configured to control and present an online website that hosts wagering games. The web server 290 can also be configured to present multiple wagering game applications on the wagering game machine 260, on the personal computing device 230 (e.g., a personal computer) via a wagering game website, or via any other gaming-type venue accessible via the Internet. The web server 290 can host an online wagering website and/or a social networking website. The web server 290 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The web server 290 can also be configured to provide content from the host gaming server 280, such as web pages that a player can load into a web browser on the personal computing device 230 that specifies progress in a persistent-state game and/or to provide non-wagering games (e.g., casual games) that relate to a theme for the persistent-state game.

The wagering game system architecture 200 can also include a secondary content server 240 configured to provide content and control information for secondary games and other secondary content available on a wagering game network (e.g., secondary wagering game content, promotions content, advertising content, player tracking content, web content, etc.). The secondary content server 240 can provide "secondary" content, or content for "secondary" games presented on the wagering game machine 260. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa. In some embodiments, the secondary content server 240 can provide and control content for community games, including networked games, social games, competitive games, or any other game that multiple players can participate in at the same time. In some embodiments, the secondary content server 240 can control and present an online website that hosts wagering games. The secondary content server 240 can also be configured to present multiple wagering game applications on the wagering game machine 260 via a wagering game website, or other gaming-type venue accessible via the Internet. The secondary content server 240 can host an online wagering website and/or a social networking website. The secondary content server 240 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The secondary content server 240 can also be configured to integrate with programs provided by the host gaming server 280. The secondary content server 240 can also provide chat functionality for a social networking website, a chat application, or any other social networking communications mechanism. In some embodiments, the secondary content server 240 can utilize player data to determine marketing promotions that may be of interest to a player account. The secondary content server 240 can also analyze player data and generate analytics for players, group players into demographics, integrate with third party marketing services and devices, etc. The secondary content server 240 can also provide player data to third parties that can use the player data for marketing. The secondary content server 240 can also provide and control content for community games, including networked games, social games, competitive games, or any other game that multiple players can participate in at the same time.

The wagering game system architecture 200 can also include a host gaming server 280 configured to process and control host-level programs. The host gaming server 280 can include a content controller 281 configured to manage and control content that can be provided to a personal computing device 230 (e.g., personal computer system, home-based gaming system, cell phone, etc.), the wagering game server 250, and/or the wagering game machine 260. For example, the content controller 281 can provide themed content associated with a persistent-state game. The themed content can be presented on the personal computing device 230, via the wagering game server 250, and/or on the wagering game machine 260. The host gaming server 280 can also include a content store 282 configured to contain content to present on the personal computing device 230, via the wagering game server 280, and/or on the wagering game machine 260. The host gaming server 280 can also include an account manager 283 configured to control information related to player accounts. For example, the account manager 283 can communicate player information, persistent-state game results, prize values, virtual trophies, etc., to the account server 270 to store in one or more player accounts associated with a persistent-state game. The host gaming server 280 can also include a communication unit 284 configured to communicate information to the personal computing device 230, the wagering game server 250, and/or the wagering game machine 260 and to communicate with other systems, devices and networks. The host gaming server 280 can also include a rule-set store 285 configured to store rule sets that include rules for timing, scheduling, transmitting, or otherwise controlling communications between the host gaming server 280, the wagering game machine 260, the wagering game server 250, third-party servers (e.g., marketing servers), the personal computing device 230, etc. The host gaming server 280 can also include a gaming controller 286 configured to track and control progress toward game goals that relate to a persistent-state game. The gaming controller 286 can communicate the game goals and progress indicators to the personal computing device 230, the wagering game server 250, and/or the wagering game machine 260.

Each component shown in the wagering game system architecture 200 is shown as a separate and distinct element connected via a communications network 222. However, some functions performed by one component could be performed by other components. For example, the wagering game server 250 can also be configured to perform functions of the secondary content server 240, the web server 290, and other network elements and/or system devices. Furthermore, the components shown may all be contained in one device, but some, or all, may be included in, or performed by, multiple devices, as in the configurations shown in FIG. 2 or other configurations not shown. For example, the account manager 253 and the communication unit 254 can be included in the wagering game machine 260 instead of, or in addition to, being a part of the wagering game server 250. Further, in some embodiments, the wagering game machine 260 can determine wagering game outcomes, generate random numbers, etc. instead of, or in addition to, the wagering game server 250.

The wagering game machines described herein (e.g., wagering game machine 260) can take any suitable form, such as floor standing models, handheld mobile units, bartop models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
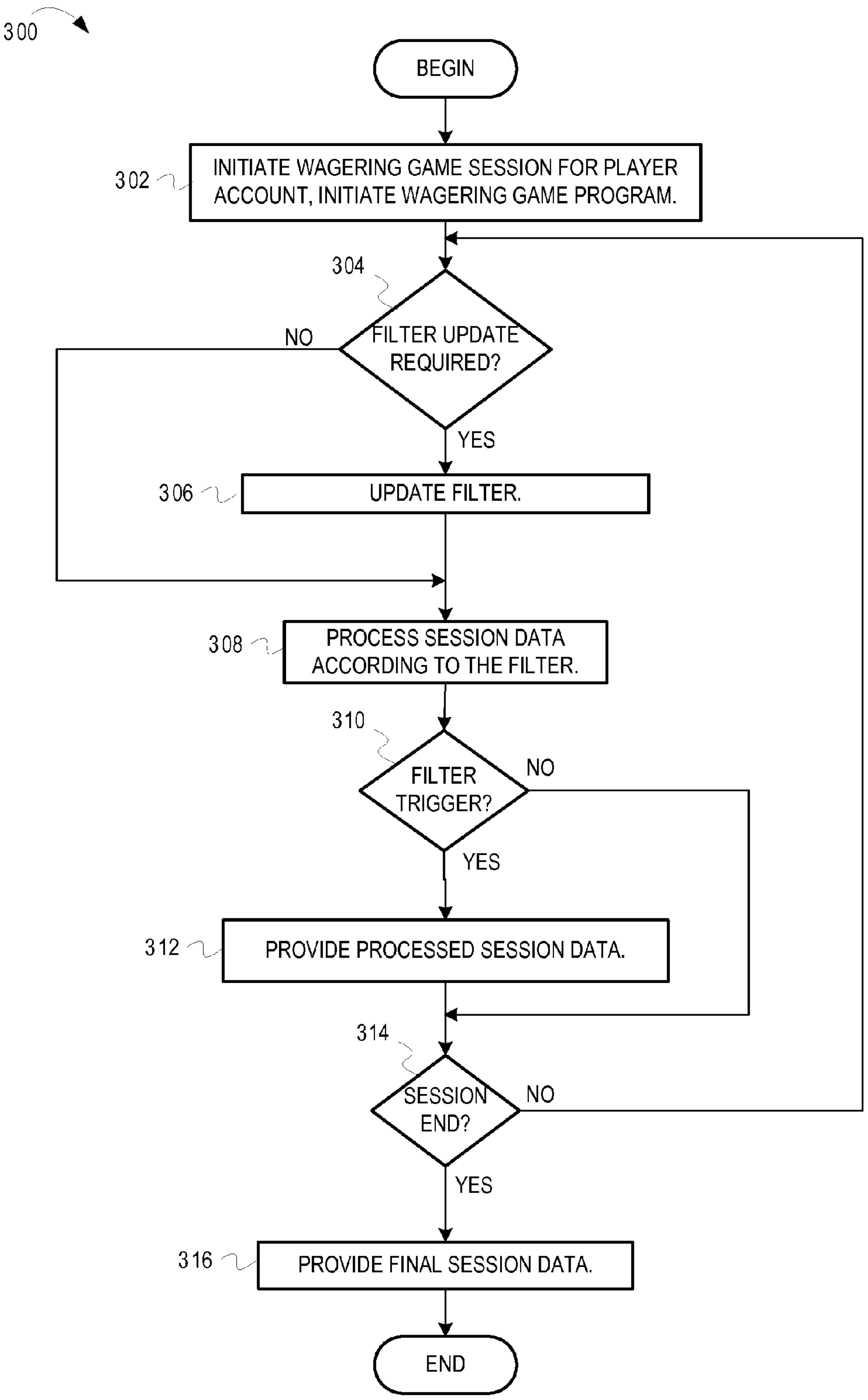
FIG. 3 is a flow diagram illustrating managing gaming session data via intelligent filtering, according to some embodiments.
Figure 5A:
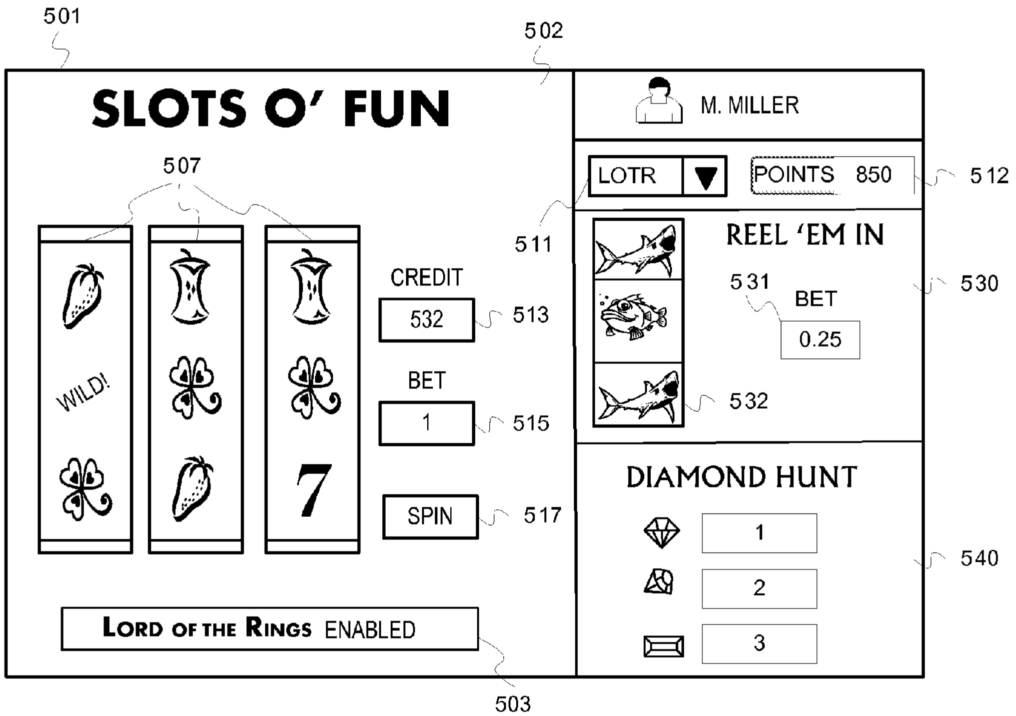
FIGS. 5A and 5B are illustrations of a wagering game system, according to some embodiments.
Figure 5B:
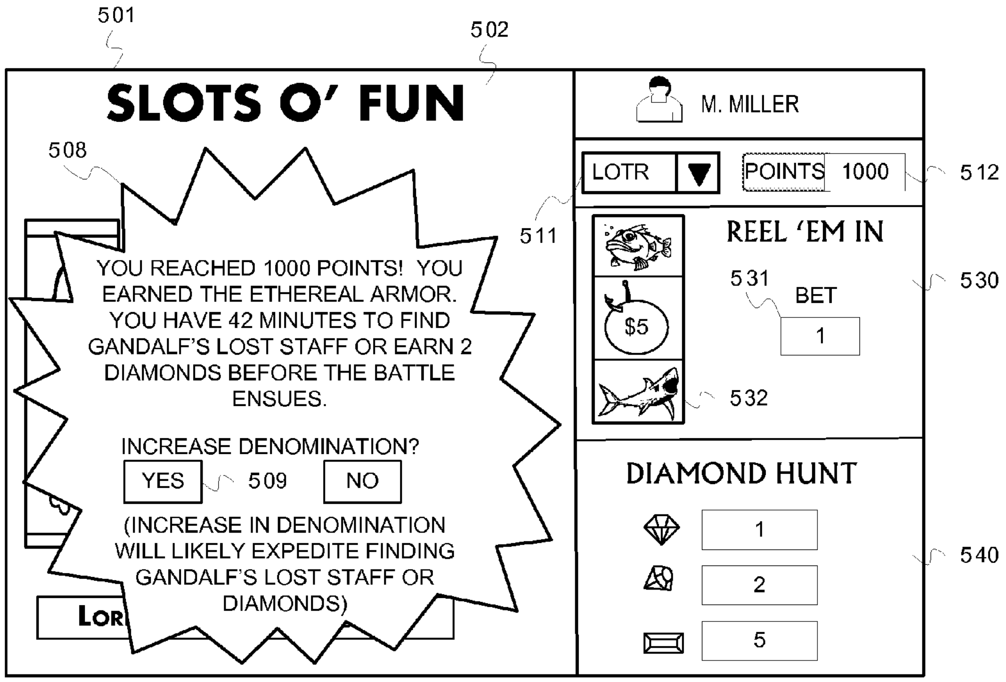

FIG. 3 is a flow diagram illustrating managing gaming session data via intelligent filtering, according to some embodiments. FIG. 3 illustrates a flow 300. The flow 300 may be performed by a wagering game system ("system"), including, for example, one of more separate components illustrated above in FIGS. 1 and 2. For example, flow 300 may be performed entirely, or in part, by a gaming module associated with a wagering game machine, a wagering game, a wagering game server, etc. FIGS. 5A and 5B are conceptual diagrams that help illustrate the flow 300 of FIG. 3, according to some embodiments. This description will present FIG. 3 in concert with FIGS. 5A and 5B.

In FIG. 3, the flow 300 begins at processing block 302, where the wagering game system ("system") initiates a wagering game session for a player account and initiates a wagering game program. In some embodiments, the wagering game program can be an application run on a wagering game machine, such as via a primary wagering game application presented via a main window on the wagering game machine. In some embodiments, the wagering game program can be a secondary wagering game presented via a secondary content client environment (e.g., an Adobe® Flash® Player, a Microsoft® Silverlight® Player, etc.) in a secondary, or auxiliary, window of a wagering game machine display. The second content client environment may present a server-side, multi-media content file (e.g., an Adobe® Shockwave® file, a Microsoft® Silverlight® file, etc.) that presents a secondary wagering game and other secondary content. The system can detect when a player logs in to a wagering game machine by detecting one or more various types of login procedures such as entering a user name and password, swiping a player tracking card, touching a radio-frequency identification (RFID) device to a login pad, entering a ticket, etc.

The flow 300 continues at processing block 304, where the system determines whether a filter needs to be updated. For example the system can determine whether a filter needs to be updated based on state data. The state data can be associated with a persistent-state game (PSG). In some embodiments, the system receives a new or updated filter provided by a host gaming server. In some embodiments, the system stores filters and determines, intelligently, whether filter settings, such as a transmission schedule for the filter, needs to be updated based on the state data for the PSG. If the filter needs updating, the flow 300 continues at processing block 306, where the system updates the filter (e.g., installs a new or updated filter received from a host gaming server, modifies a transmission schedule setting for a stored filter, etc.). The filter can specify triggers that indicate the occurrence of conditions, events, etc. that in a wagering game that would result in a specific level, or degree, of progress in a PSG.

The flow 300 continues at processing block 308, where the system processes session data according to the filter. For example, the system can accumulate the data according to filter settings, such as a transmission schedule indicated in the filter, which only transmits session data after certain triggers occur.

The flow 300 continues at processing block 310 where the system determines that a trigger occurs. Triggers may include, or specify, settings or conditions that, when reached or activated during a gaming session, activate the trigger. The settings or conditions can relate to activities, events, accomplishments, configurations, etc. of the wagering game session. Some specific triggers, or conditions associated with triggers, may refer to wagering amounts, configurations of wagering game elements, reel-stop configurations, wagering game outcomes, card hand configurations, bonus game values, a number of hands dealt in a wagering game, a specific number of spins of a reel, a threshold value in a point counter, group game activity, casino challenge activity, etc. If no trigger occurs, the flow can continue at processing block 314 where the system determines whether the session ends via player input (e.g., logout). If the session ends, the flow 300 continues at processing block 316, where the system provides final session data, including any accumulated session data. If, however, at processing block 314 the session does not end, the flow 300 returns to processing block 304 where the system determines whether the filter requires an update (e.g., an update may be required if a host gaming server has provided an updated filter). If no update is required then the flow 300 returns to processing block 308 where the system continues accumulating session data.

If, however, at processing block 310 the system determines that a trigger does occur, the flow 300 continues at processing block 312 wherein the system provides processed session data. The system can provide the processed session data according to a trigger. For instance, the system can send a data packet of accumulated session data via a communications network to a host gaming server after the trigger occurs. The data packet can include session data of events, conditions, etc., that occurred over a plurality of wagers, plays, spins, hands, wins, losses, or any other wagering-game-related event or condition. For instance, in one embodiment, a trigger may specify that after every 10 spins, after every 5 win results, or after every 20 credits bet the system should transmit accumulated session data. In another instance, the system may detect a trigger than indicates a specific leaderboard status, a simultaneous play activity amongst team members, an acquisition of a scavenger hunt item, an achievement of a race conditions before a competitor, an occurrence of a certain number of bonus games, etc. and then send accumulated session data. In yet another example, the system may detect a trigger that specifies a number of progress points that would result from events that occur via a wagering game program (e.g., transmit session data after every 25 points accumulated for the PSG).

After processing block 312, the flow 300 continues at processing block 314 where the system determines whether the session ends via player input (e.g., logout). If the session ends, the flow 300 continues at processing block 316, where the system can provides final session data. If, however, at processing block 314 the session does not end, the flow 300 returns to processing block 304 where the system determines whether the filter requires an update. FIGS. 5A and 5B illustrate one example of detecting a trigger associated with a threshold value that requires an update to the filter. In FIGS. 5A and 5B, a wagering game machine display 501 presents a primary wagering game 502 (e.g., "Slots O' Fun"), a first secondary wagering game 530 (e.g., "Reel 'Em In") and a second secondary wagering game 540 (e.g., "Diamond Hunt"). The primary wagering game 502 and the secondary wagering game 530 each are slot-type games with reels 507 and 532 that spin according to a single spin control 517 (or separate spin controls in other embodiments). A credit meter 513 can specify a credit balance for a player account. The primary wagering game 502 can present a first bet meter 515 of a first denomination value (e.g., $1). The secondary wagering game 530 can present a second bet meter 531 of a second denomination value (e.g., $0.25). The secondary wagering game 540 is not a slot-type game but represents an item-collection type game (e.g., a challenge, a scavenger hunt game, etc.) that a player may play individually or with other players. The wagering game machine display 501 also presents a PSG progress indicator 512. The PSG progress indicator 512 indicates a degree of progress in a themed PSG (e.g., a "Lord of the Rings" themed PSG indicated by the dropdown menu 511). A player account is logged in to a wagering game machine associated with the wagering game machine display 501. The player account may be registered for multiple PSGs. The dropdown menu 511 can present any one of the PSGs for which the player account is registered and/or that are integrated with the primary wagering game 502 or the secondary wagering games 530 and 540. For example, the primary wagering game 502 indicates, via an indicator 503, that the "Slots O' Fun" wagering game is enabled for, or integrated with, the "Lord of the Rings" persistent-state game, or in other words, that activities from the "Slots O' Fun" wagering game can contribute to progress in the "Lord of the Rings" persistent-state game. The secondary wagering games 530 and/or 540 may also be enabled for the "Lord of the Rings" persistent-state game.

In FIG. 5A, the PSG progress indicator 512 specifies that the player account has attained, in the "Lord of the Rings" persistent-state game, a first value of 850 progress points. A filter may originally include a first trigger condition that specifies that after events of the primary wagering game 502 and/or the secondary wagering games 530 and/or 540 occur that would result in 25 additional progress points in the PSG. For example, the PSG progress indicator may increase by 1-point increments as events or activities occur in the primary wagering game 502 and/or the secondary wagering games 530 and/or 540 that would add to the progress of the "Lord of the Rings" PSG. However, when the PSG progress indicator 512 reaches threshold values of 875 progress points, 900 progress points, 925 progress points, and so forth, the filter should transmit a packet of accumulated session data for the events that occurred between the respective 25-point accumulations. The filter may also include a second trigger condition that when the point total in the PSG progress indicator 512 reaches 950 progress points, the filter should stop waiting for 25-point accumulations, but instead should begin transmitting packets of session data after each spin for any one of the primary wagering game 502 and/or the secondary wagering game 530. The filter may also include a third trigger condition that when the point total in the PSG progress indicator 512 reaches a 1000-point threshold value, the PSG will award a prize and the PSG will enter a new phase that requires an new, additional, or updated filters and/or filter conditions. Applying the flow 300 to FIGS. 5A and 5B, if the PSG progress indicator 512 reaches, for example, a second value of 875 points, then, at processing block 312, the system will transmit accumulated session data and, if the session is still active, the flow 300 will loop back to processing block 304. The system can then reassess the filter conditions. For instance because the point total only reached 875 points, there was no need to update the filter (e.g., no need to change a filter transmission schedule or trigger setting), and so the flow 300 continues accumulating data and transmitting accumulated session data at each 25-point increment (via additional loops of the processing blocks 304-314). However, when the PSG progress indicator 512 reaches a value of 950 points, and when the flow 300 is looped back to processing block 304, the system determines that, according to the filter conditions, the filter should be updated (e.g., the filter transmission scheduled should change to transmit session data after each spin of either the primary wagering game 502 or the secondary wagering game 530 instead of at 25-point increments). The system then updates the filter, at processing block 306, and accumulates session data and transmits the accumulated session data at much shorter intervals (i.e., at only 1 spin intervals) via additional loops of the processing blocks 304-314. When the PSG progress indicator 512 reaches a value of 1000 progress points, then in FIG. 5B, the wagering game machine display 501 presents a congratulatory indicator 508 that specifies a prize in the PSG (e.g., the ethereal armor trophy). The PSG then enters a bonus phase with a time limit (e.g., 42 minutes) in which the player can seek for additional objects (e.g., Gandalf s staff or two diamonds from the secondary wagering game 540). The additional objects can be earnable by additional play from the primary wagering game 502, the secondary wagering game 530, and/or the secondary wagering game 540. The congratulatory indicator 508 further includes a prompt 509 to increase a denomination value which may increase chances of obtaining the additional objects. Again applying the flow 300 to FIGS. 5A and 5B, after the PSG progress indicator 512 reaches the 1000-point threshold value, the flow 300 loops to processing block 304 and determines that the filter must be updated. The system can update the filter with entirely new criteria related to the new phase of the PSG game (e.g., to the bonus phase). The updated filter may include trigger conditions that are specific to the criteria indicated in the congratulatory prompt 508 (e.g., the time limit, the increase or non-increase of the denomination value, a number of diamonds already accumulated in the secondary wagering game 540) or other criteria or conditions that relate to a current state of the PSG, a current state of the gaming session, a number of other players competing in the bonus phase, etc.

Figure 4:
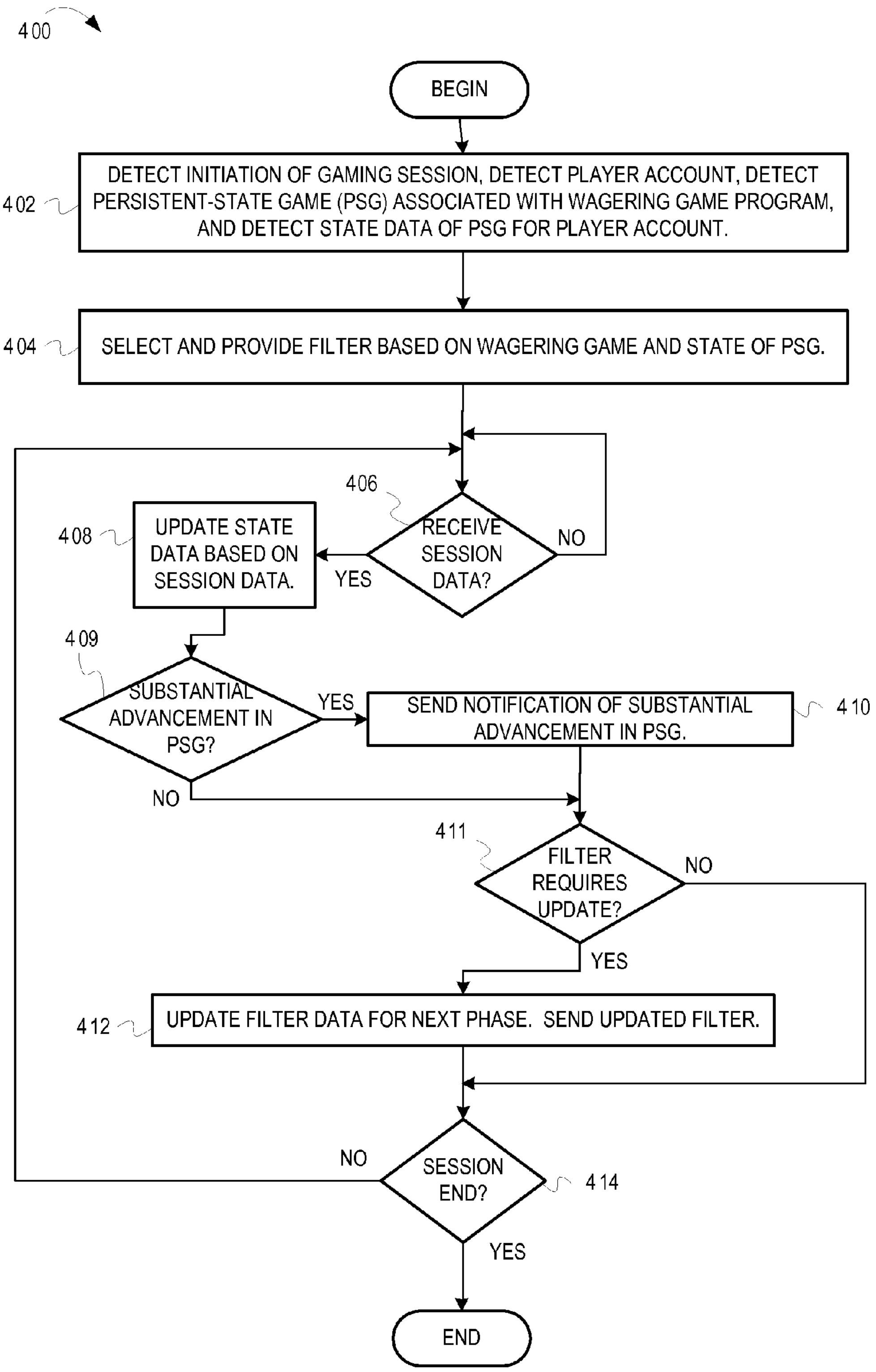
FIG. 4 is a flow diagram illustrating managing gaming session data via intelligent filtering, according to some embodiments.

FIG. 4 is a flow diagram illustrating managing gaming session data via intelligent filtering, according to some embodiments. FIG. 4 illustrates a flow 400. The flow 400 may be performed by a wagering game system ("system"), including, for example, one of more separate components illustrated above in FIGS. 1 and 2. For example, flow 400 may be performed entirely, or in part, by a gaming controller associated with a host gaming server.

In FIG. 4, the flow 400 begins at processing block 402 where the system detects an initiation of a gaming session, detects a player account associated with the gaming session, detects a persistent-state game (PSG) associated with the wagering game program and the player account, and detects state data of the PSG for the player account. For example, depending on whether a particular player account registered for one or more PSGs and depending on whether certain PSG are integrated with the wagering game program, the system may detect one or more different PSGs that may need to be tracked during the gaming session. Each one of the PSGs has a state and the system can detect the state for each one of the PSGs. For simplicity, the description of FIG. 4 will assume that only one PSG is detected. The system returns the state of the PSG, such as, by providing a point balance (e.g., as indicated by the PSG progress indicator 512 in FIG. 5A).

The flow 400 continues, at processing block 404, where the system selects and provides a filter based on the wagering game and the state of the PSG. For instance, the system can provide the filter and the state data to a gaming module associated with a wagering game program.

The flow 400 continues, at processing block 406, where the system determines whether session data has been received. For example, the system may receive, from a gaming module, session data related to a game event (e.g., bet amounts, win/loss results, etc.) during the gaming session.

The flow 400 continues, at processing block 408, where the system updates state data of the PSG based on the session data. For example, the system can receive periodic data packets of session data that specify a number of spins, game plays, gaming accomplishments, etc., which occurred during the gaming session for the wagering game program. The PSG may award certain progress points for the number of spins, game plays, gaming accomplishments, etc. In some embodiments, the system can also send updated state data to a source that provided the session data.

The flow 400 continues, at processing block 409, where the system determines whether the update to the state of the PSG results in a substantial advancement. For example, the PSG may reach a level of progress where a milestone is reached and/or an award is provided. If so, the flow 400 can continue at processing block 410 where the system sends a notification of the substantial advancement. The system can send the notification to a wagering game machine, a wagering game program, a wagering game server, a cell phone, a third party server, any device that contains a gaming module, any contact specified in a player account, or any device, machine, or entity that may be related to the PSG or have interest in substantial advancements in the PSG. The notification of the substantial advancement in the PSG can notify a player, during a gaming session, of persistent-state game progress, awards, prizes, advancement, etc. so that a player can make decisions during the game session regarding how to perform additional activity during the gaming session. Further, because the system can communicate data to a player during a wagering game session, and receive feedback from the player during the wagering game session, the system can limit an amount of data that it writes to a hard drive associated with a host gaming server. For example, because the system can respond to session data during a wagering game session, the system can progress a PSG without having to wait for a wagering game player to login to a website after the gaming session. The system can instead engage in communications with the player during the gaming session and notify the player during the wagering game session of the progress made in the PSG.

The flow 400 continues, at processing block 411, where the system determines whether the filter needs updating based on the information provided in the session data and/or based on the updated state of the PSG. For example, if the PSG experiences a substantial advancement based on the session data that requires updated filter settings (e.g., the PSG progress indicator 512 in FIG. 5B reaches the 1000-point threshold value), then the flow 400 continues at processing block 412 where the system updates the filter and provides an updated filter. The system can provide the updated filter to a gaming module to utilize during the gaming session. If the filter does not require updating, then the flow 400 can continue at processing block 412.

The flow 400 continues, at processing block 412, wherein the system determines whether the session data indicates an end to the session. If not, then the flow 400 loops and continues at processing block 406. Otherwise, the flow 400 ends.

In some embodiments, flow 300 and flow 400 may be performed in parallel. For example, flow 400 may begin after the system described in FIG. 3 (first system) initiates the wagering game session as described in processing block 302. After the first system initiates the wagering game session, the first system may then wait, or periodically check, for the system described in FIG. 4 (second system) to provide the filter, as described in processing block 404, before the first system continues to perform operations described in processing blocks 304-312. In another example, after the second system performs operations described in processing block 404, the second system may wait, or periodically check, for the first system to send session data, such as described in processing block 312. After the second system receives the session data, as described in processing block 406, the second system may continue to perform operations described in processing blocks 406-414. After performing the operations described in processing blocks 406-414, the second system can wait for additional session data (e.g., as indicated by the loop back to processing block 406 of flow 400).

Additional Example Embodiments

According to some embodiments, a wagering game system ("system") can provide various example devices, operations, etc., to manage gaming data. The following non-exhaustive list enumerates some possible embodiments.

- In some embodiments the system can enforce rule sets at multiple levels (e.g., different machines, different nodes, etc.). The system can include rule set controllers at different levels to perform different rule set activities for the levels. The system can concurrently enforce the rule sets in layers (e.g., enforce filters at each level/node).
- In some embodiments the system can track non wagering activity and non-game activity from a gaming session as well as gaming activity. The system can track any piece of data that a host gaming server can respond to during the wagering game session including non-gaming activity. For example, the system can track a login time for a player and reward the player with a benefit relevant to the login time (e.g., a website associated with the host gaming server may want to reward a player that logs in to a wagering game machine at 6 AM every day by providing a breakfast buffet coupon).
- In some embodiments the system can provide a configuration application or customizable tool so that a casino operator can configure rule sets, make rules sets, etc.

In some embodiments the system can track state data for third-party games or challenges associated with a third-party reward provider (e.g., a casino challenge that provides 50 retailer gift certificates).

In some embodiments, the system can include a client-level application (e.g., an Adobe™ Shockwave™ file or .SWF file) that is pre-configured with a rule set. For example, the .SWF file can have a table that specifies persistent-state game goals (e.g., milestones, trophies, etc.) and threshold values at which the game goals are completed.

In some embodiments, the system can utilize accumulated session data at the level at which the session data is accumulated before sending the accumulated session data to a higher level or node. For example, the system can update a PSG point total on a .SWF as a player plays without sending game play activity up to an upper level node (e.g. as illustrated by the PSG progress indicator 512 in FIGS. 5A and 5B). In another example, the system can write accumulated session data to a non-volatile random access memory (NVRAM) on a wagering game machine. After the data is sent to a higher level, the system can erase the accumulated session data from the NVRAM.

In some embodiments the system can send state data to mobile devices (e.g., send an update of a leaderboard status to mobile devices registered to a player account and/or to social contacts indicated by the player accounts).

Additional Example Operating Environments

This section describes example operating environments, systems and networks, and presents structural aspects of some embodiments.

Wagering Game Computer System

Figure 6:
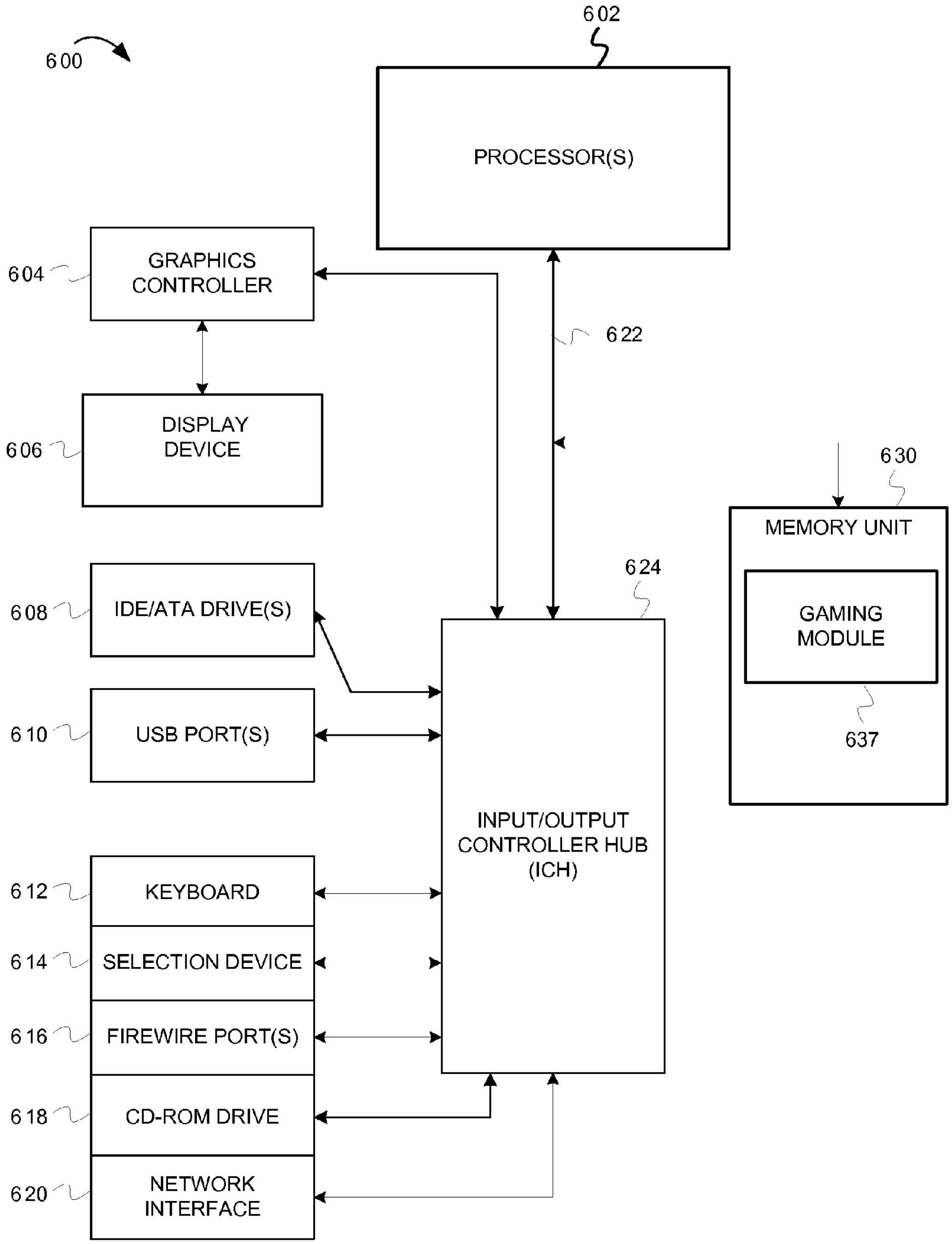
FIG. 6 is an illustration of a wagering game computer system 600, according to some embodiments.

FIG. 6 is a conceptual diagram that illustrates an example of a wagering game computer system 600, according to some embodiments. In FIG. 6, the wagering game computer system ("computer system") 600 may include a processor unit 602, a memory unit 630, a processor bus 622, and an input/output controller hub (ICH) 624. The processor unit 602, memory unit 630, and ICH 624 may be coupled to the processor bus 622. The processor unit 602 may comprise any suitable processor architecture. The computer system 600 may comprise one, two, three, or more processors, any of which may execute a set of instructions in accordance with some embodiments.

The memory unit 630 may also include an I/O scheduling policy unit and I/O schedulers. The memory unit 630 can store data and/or instructions, and may comprise any suitable memory, such as a dynamic random access memory (DRAM), for example. The computer system 600 may also include one or more suitable integrated drive electronics (IDE) drive(s) 608 and/or other suitable storage devices. A graphics controller 604 controls the display of information on a display device 606, according to some embodiments.

The ICH 624 provides an interface to I/O devices or peripheral components for the computer system 600. The ICH 624 may comprise any suitable interface controller to provide for any suitable communication link to the processor unit 602, memory unit 630 and/or to any suitable device or component in communication with the ICH 624. The ICH 624 can provide suitable arbitration and buffering for each interface.

For one embodiment, the ICH 624 provides an interface to the one or more IDE drives 608, such as a hard disk drive (HDD) or compact disc read only memory (CD ROM) drive, or to suitable universal serial bus (USB) devices through one or more USB ports 610. For one embodiment, the ICH 624 also provides an interface to a keyboard 612, selection device 614 (e.g., a mouse, trackball, touchpad, etc.), CD-ROM drive 618, and one or more suitable devices through one or more firewire ports 616. For one embodiment, the ICH 624 also provides a network interface 620 though which the computer system 600 can communicate with other computers and/or devices.

The computer system 600 may also include a machine-readable storage medium that stores a set of instructions (e.g., software) embodying any one, or all, of the methodologies for managing gaming data. Furthermore, software can reside, completely or at least partially, within the memory unit 630 and/or within the processor unit 602. The computer system 600 can also include a wagering game module 637. The wagering game module 637 can process communications, commands, or other information, to manage gaming data. Any component of the computer system 600 can be implemented as hardware, firmware, and/or machine-readable storage media including instructions for performing the operations described herein.

Personal Wagering Game System

Figure 7:
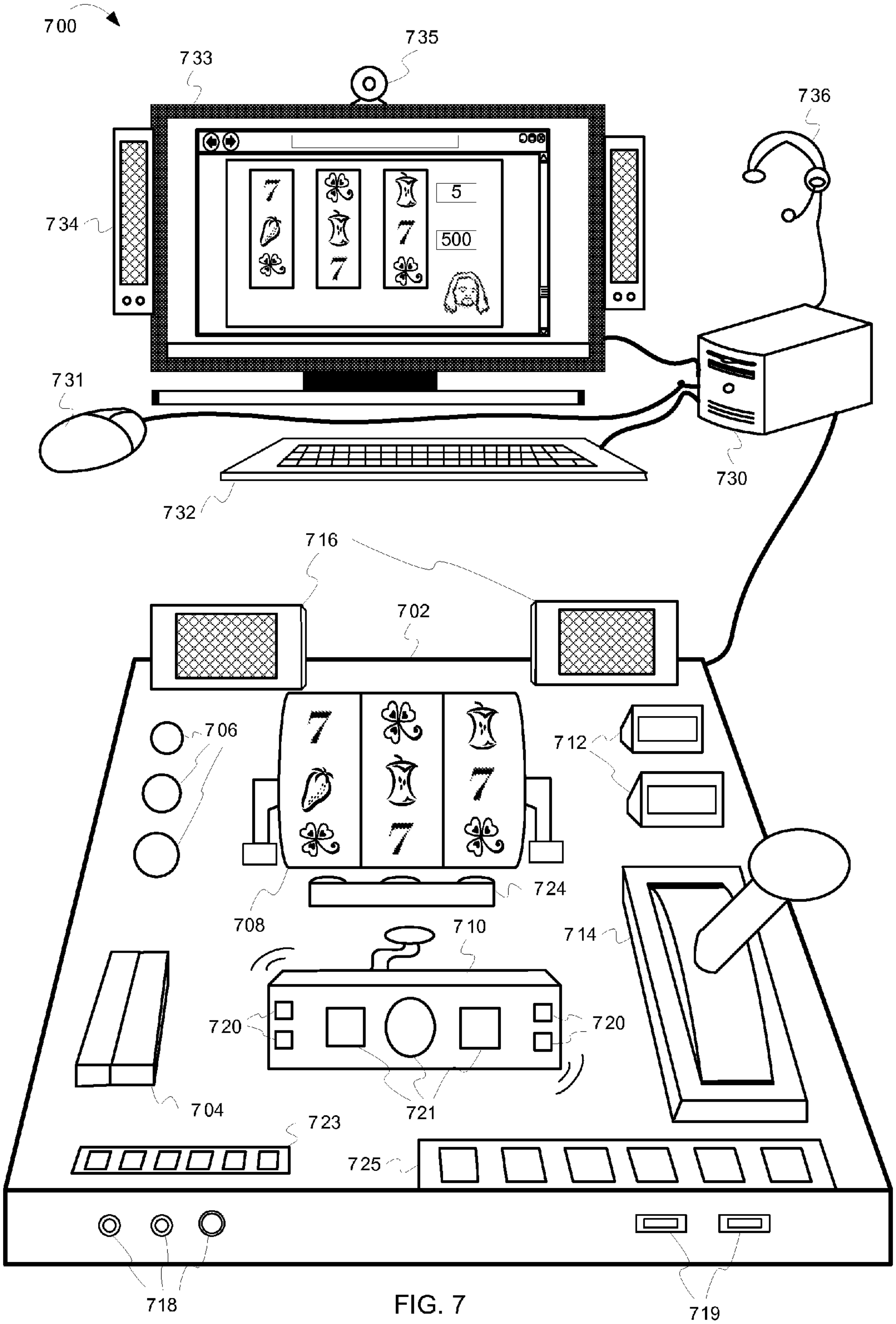
FIG. 7 is an illustration of a personal wagering game system 700, according to some embodiments.

FIG. 7 is a conceptual diagram that illustrates an example of a personal wagering game system 700, according to some embodiments. In FIG. 7, the personal wagering game system ("system") 700 includes an exemplary computer system 730 connected to several devices, including user input devices (e.g., a keyboard 732, a mouse 731), a web-cam 735, a monitor 733, speakers 734, and a headset 736 that includes a microphone and a listening device. In some embodiments, the webcam 735 can detect fine details of a person's facial features, from an eye-level perspective. The web-cam 735 can use the fine detail to determine a person's identity, their demeanor, their facial expressions, their mood, their activities, their eye focus, etc. The headset 736 can include biometric sensors configured to detect voice patterns, spoken languages, spoken commands, etc. The biometric sensors in the web-cam 735 can detect colors (e.g., skin colors, eye colors, hair colors, clothing colors, etc.) and textures (e.g., clothing material, scars, etc.). The biometric sensors in the web-cam 735 can also measure distances between facial features (e.g., distance between eyes, distance from eyes to nose, distance from nose to lips, length of lips, etc.). The system 700 can generate a facial and body map using the detected colors, textures, and facial measurements. The system 700 can use the facial and body map to generate similar facial features and body appearances for a player account avatar. Also connected to the computer system 730 is a gaming control device ("gaming pad") 702 including wagering game accoutrements associated with wagering games. The wagering game accoutrements include one or more of reels 708, game meters 712, indicators 706, a game control device 710, a physical lever 714, a magnetic card reader 704, a video projection device 724, input/output ports 718, USB ports 719, and speakers 716. The gaming pad 702 can present feedback of online activities. For instance, the gaming pad 702 can use vibrations and signals on the gaming control device (e.g., the game control device 710 or the physical lever 714 can vibrate to indicate a back pat from another player or a game celebration, the indicators 706 can blink, etc.). The physical lever 714 can produce feelings in the lever to emulate a pulling feel or a vibration. The video projection device 724 can project video onto the reels 708 so that the reels 708 can present many different types of wagering games. The reels 708 can spin when the physical lever 714 is pulled. The video projection device 724 can project reel icons onto the reels 708 as they spin. The video projection device 724 can also project reel icons onto the reels 708 when the reels 708 are stationary, but the imagery from the video project device 724 makes the reels 708 appear to spin. The magnetic card reader 704 can be used to swipe a credit card, a player card, or other cards, so that the system can quickly get information. The system 700 can offer lower rates for using the magnetic card reader 704 (e.g., to get a lower rate per transaction). The game control device 710 can include an emotion indicator keypad with keys 720 that a player can use to indicate emotions. The game control device 710 can also include biometric devices 721 such as a heart-rate monitor, an eye pupil dilation detector, a fingerprint scanner, a retinal scanner, voice detectors, speech recognition microphones, motion sensors, sound detectors, etc. The biometric devices 721 can be located in other places, such as in the headset 736, within a chair (not shown), within personal control devices (e.g. joysticks, remote controls, game pads, roller-balls, touch-pads, touch-screens, etc.), within the web-cam 735, or any other external device. The external devices can be connected to the computer 730 or to the game control device 710 via the input/output ports 718. As a security feature, some biometric devices can be associated with some of the gaming pad devices (e.g., the magnetic card reader 704), such as a fingerprint scanner, a retinal scanner, a signature pad to recognize a player's signature, etc. The game control device 710 can also use the keys 720 to share items and control avatars, icons, game activity, movement, etc. within a network wagering venue. The game pad can also have an electronic (e.g., digital) button panel 725, an electronic control panel 723, or any other type of changeable panel that can change appearance and/or configuration based on the game being played, the action being performed, and/or other activity presented within an online gaming venue. The game control device 710 can also move in different directions to control activity within the online gaming venue (e.g., movement of a player's avatar moves in response to the movements of the game control device 710). Avatars can be pre-programmed to act and look in certain ways, which the player can control using the system 700. The gaming pad 702 can permit the player to move the avatar fluidly and more easily than is possible using a standard keyboard. The system 700 can cause an avatar to respond to input that a player receives via the gaming pad 702. For example, a player may hear a sound that comes primarily from one direction (e.g., via stereophonic signals in the headset 736) within the network wagering venue. The system 700 can detect the movement of the player (e.g., the system 700 detects that a player moves his head to look in the direction of the sound, the player uses the game control device 710 to move the avatar's perspective to the direction of the sound, etc.). The system 700 can consequently move the avatar's head and/or the avatar's perspective in response to the player's movement. The player can indicate an expression of an emotion indicated by the player using the keys 720. The system 700 can make the avatar's appearance change to reflect the indicated emotion. The system 700 can respond to other movements or actions by the player and fluidly move the avatar to respond. The system 700 can also interpret data provided by the biometric devices and determine expressions and/or indications of emotions for a player using the system 700.

Wagering Game Machine Architecture

Figure 8:
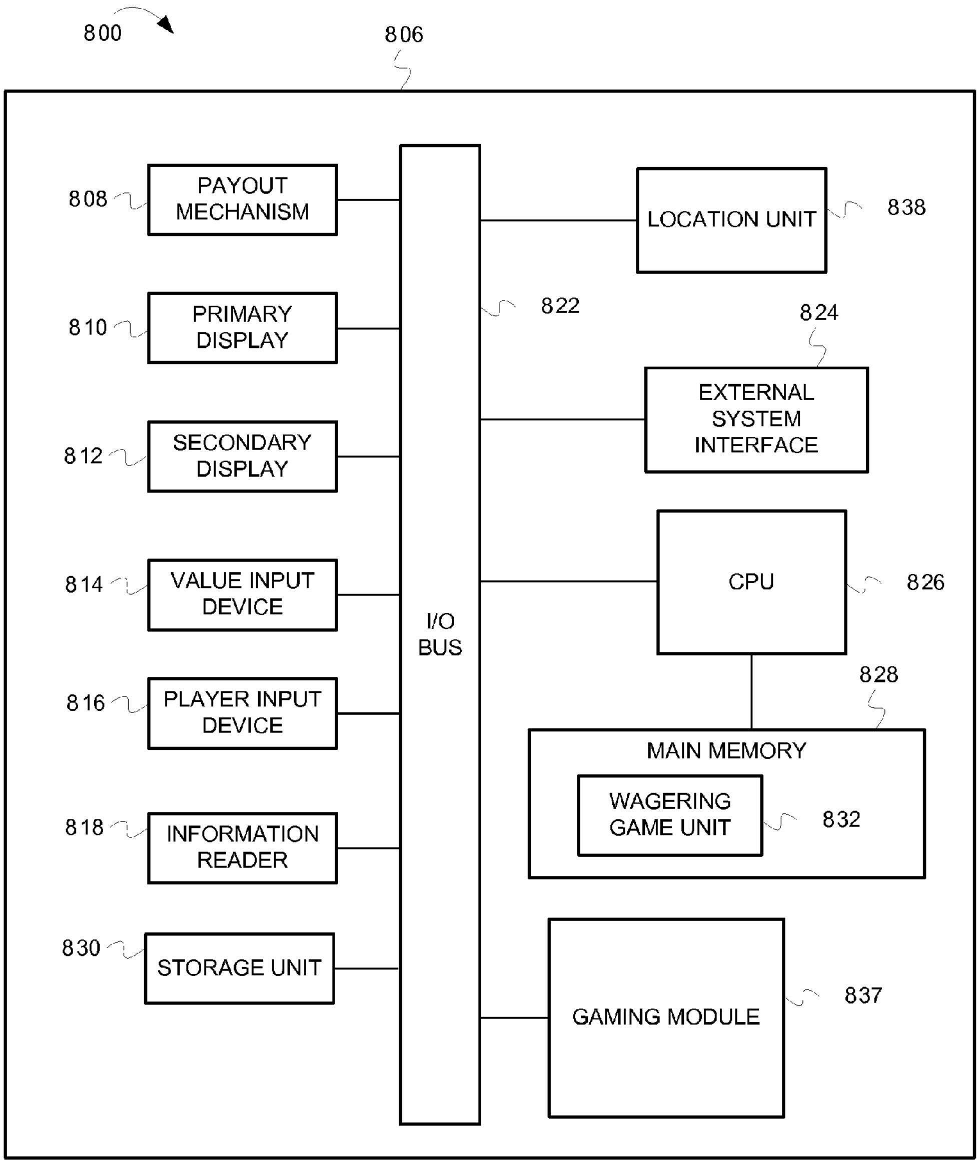
FIG. 8 is an illustration of a wagering game machine architecture 800, according to some embodiments.

FIG. 8 is a conceptual diagram that illustrates an example of a wagering game machine architecture 800, according to some embodiments. In FIG. 8, the wagering game machine architecture 800 includes a wagering game machine 806, which includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC processor. The main memory 828 includes a wagering game unit 832. In some embodiments, the wagering game unit 832 can present wagering games, such as video poker, video black jack, video slots, video lottery, reel slots, etc., in whole or part.

The CPU 826 is also connected to an input/output ("I/O") bus 822, which can include any suitable bus technologies, such as an AGTL+ frontside bus and a PCI backside bus. The I/O bus 822 is connected to a payout mechanism 808, primary display 810, secondary display 812, value input device 814, player input device 816, information reader 818, and storage unit 830. The player input device 816 can include the value input device 814 to the extent the player input device 816 is used to place wagers. The I/O bus 822 is also connected to an external system interface 824, which is connected to external systems (e.g., wagering game networks). The external system interface 824 can include logic for exchanging information over wired and wireless networks (e.g., 802.11g transceiver, Bluetooth transceiver, Ethernet transceiver, etc.)

The I/O bus 822 is also connected to a location unit 838. The location unit 838 can create player information that indicates the wagering game machine's location/movements in a casino. In some embodiments, the location unit 838 includes a global positioning system (GPS) receiver that can determine the wagering game machine's location using GPS satellites. In other embodiments, the location unit 838 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 8, in some embodiments, the location unit 838 is not connected to the I/O bus 822.

In some embodiments, the wagering game machine 806 can include additional peripheral devices and/or more than one of each component shown in FIG. 8. For example, in some embodiments, the wagering game machine 806 can include multiple external system interfaces 824 and/or multiple CPUs 826. In some embodiments, any of the components can be integrated or subdivided.

In some embodiments, the wagering game machine 806 includes a gaming module 837. The gaming module 837 can process communications, commands, or other information, where the processing can manage gaming rules sets and communications.

Furthermore, any component of the wagering game machine 806 can include hardware, firmware, and/or machine-readable storage media including instructions for performing the operations described herein.

Wagering Game Machine

Figure 9:
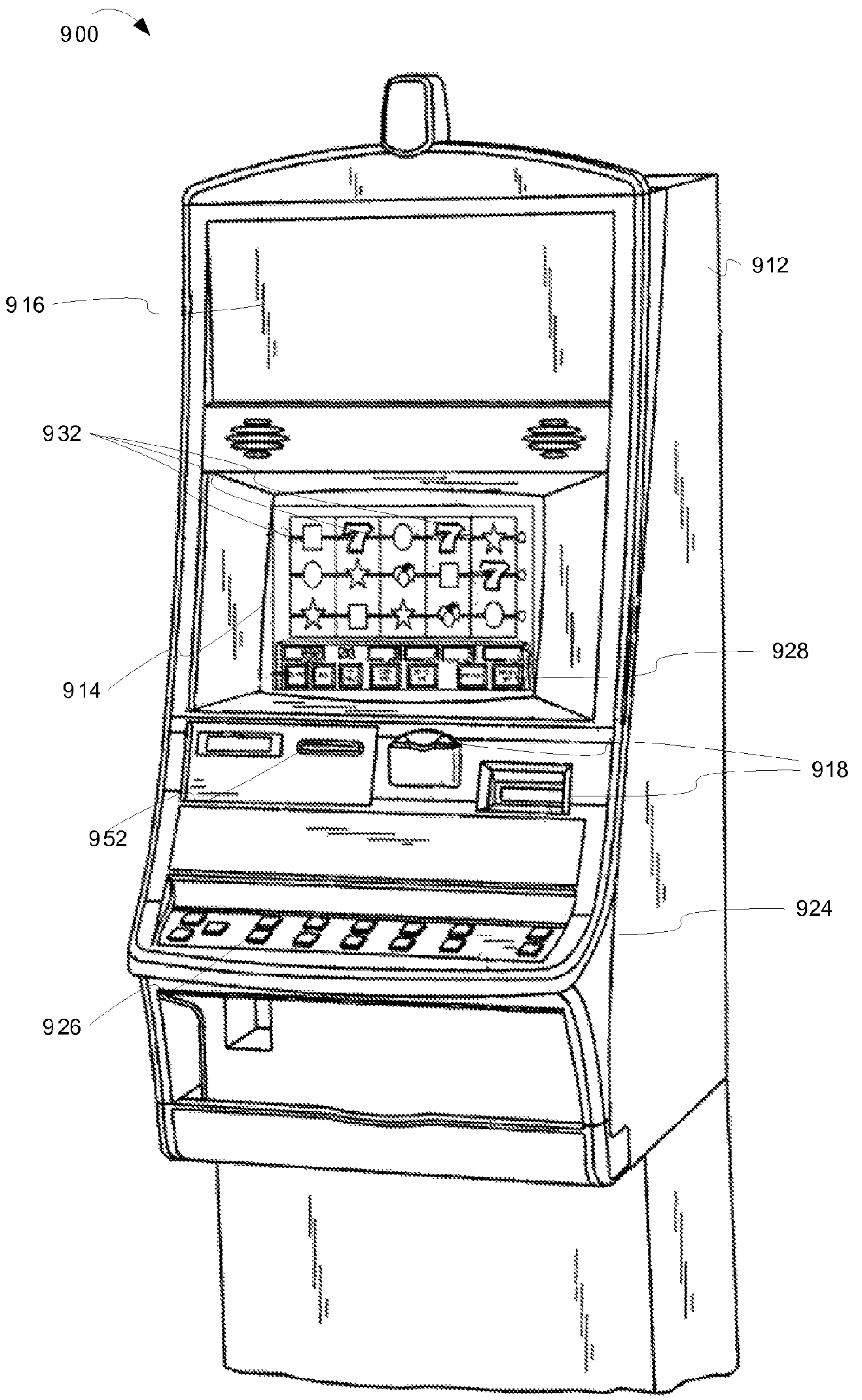
FIG. 9 is an illustration of a wagering game machine 900, according to some embodiments.

FIG. 9 is a conceptual diagram that illustrates an example of a wagering game machine 900, according to some embodiments. Referring to FIG. 9, the wagering game machine 900 can be used in gaming establishments, such as casinos. According to some embodiments, the wagering game machine 900 can be any type of wagering game machine and can have varying structures and methods of operation. For example, the wagering game machine 900 can be an electromechanical wagering game machine configured to play mechanical slots, or it can be an electronic wagering game machine configured to play video casino games, such as blackjack, slots, keno, poker, blackjack, roulette, etc.

The wagering game machine 900 comprises a housing 912 and includes input devices, including value input devices 918 and a player input device 924. For output, the wagering game machine 900 includes a primary display 914 for displaying information about a basic wagering game. The primary display 914 can also display information about a bonus wagering game and a progressive wagering game. The wagering game machine 900 also includes a secondary display 916 for displaying wagering game events, wagering game outcomes, and/or signage information. While some components of the wagering game machine 900 are described herein, numerous other elements can exist and can be used in any number or combination to create varying forms of the wagering game machine 900.

The value input devices 918 can take any suitable form and can be located on the front of the housing 912. The value input devices 918 can receive currency and/or credits inserted by a player. The value input devices 918 can include coin acceptors for receiving coin currency and bill acceptors for receiving paper currency. Furthermore, the value input devices 918 can include ticket readers or barcode scanners for reading information stored on vouchers, cards, or other tangible portable storage devices. The vouchers or cards can authorize access to central accounts, which can transfer money to the wagering game machine 900.

The player input device 924 comprises a plurality of push buttons on a button panel 926 for operating the wagering game machine 900. In addition, or alternatively, the player input device 924 can comprise a touch screen 928 mounted over the primary display 914 and/or secondary display 916.

The various components of the wagering game machine 900 can be connected directly to, or contained within, the housing 912. Alternatively, some of the wagering game machine's components can be located outside of the housing 912, while being communicatively coupled with the wagering game machine 900 using any suitable wired or wireless communication technology.

The operation of the basic wagering game can be displayed to the player on the primary display 914. The primary display 914 can also display a bonus game associated with the basic wagering game. The primary display 914 can include a cathode ray tube (CRT), a high resolution liquid crystal display (LCD), a plasma display, light emitting diodes (LEDs), or any other type of display suitable for use in the wagering game machine 900. Alternatively, the primary display 914 can include a number of mechanical reels to display the outcome. In FIG. 9, the wagering game machine 900 is an "upright" version in which the primary display 914 is oriented vertically relative to the player. Alternatively, the wagering game machine can be a "slant-top" version in which the primary display 914 is slanted at about a thirty-degree angle toward the player of the wagering game machine 900. In yet another embodiment, the wagering game machine 900 can exhibit any suitable form factor, such as a free standing model, bar top model, mobile handheld model, or workstation console model.

A player begins playing a basic wagering game by making a wager via the value input device 918. The player can initiate play by using the player input device's buttons or touch screen 928. The basic game can include arranging a plurality of symbols 932 along a pay line, which indicates one or more outcomes of the basic game. Such outcomes can be randomly selected in response to player input. At least one of the outcomes, which can include any variation or combination of symbols, can trigger a bonus game.

In some embodiments, the wagering game machine 900 can also include an information reader 952, which can include a card reader, ticket reader, bar code scanner, RFID transceiver, or computer readable storage medium interface. In some embodiments, the information reader 952 can be used to award complimentary services, restore game assets, track player habits, etc.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product, or software, that may include a machine-readable storage medium having stored thereon instructions, which may be used to program a computer system (or other electronic device(s)) to perform a process according to embodiments(s), whether presently described or not, because every conceivable variation is not enumerated herein. A machine-readable storage medium includes any mechanism that stores information in a form readable by a machine (e.g., a wagering game machine, computer, etc.). For example, machine-readable storage media includes read only memory (ROM), random access memory (RAM), magnetic disk storage media, optical storage media (e.g., CD-ROM), flash memory machines, erasable programmable memory (e.g., EPROM and EEPROM); etc. Some embodiments of the invention can also include machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method of operating a gaming system comprising:

determining, via the gaming system, occurrence of eligible events from a wagering game presented by a wagering game machine in a casino, wherein the eligible events are events that cause progress in a persistent-state game controlled by a server external to the casino, wherein the server is configured to add at least one point for each eligible event from the wagering game to a point total for the persistent-state game, and wherein the server is configured to award a level of progress each time the point total reaches a threshold value that corresponds to the level;

accumulating, via the gaming system, a first set of event indicators according to a first accumulation setting without providing the first set of event indicators to the server, wherein the first set of event indicators correspond to a first portion of the eligible events;

after accumulating the first set of event indicators, determining, via the gaming system, that the first set of event indicators would cause the point total to be a given number of points away from a first threshold value that corresponds to a first level of progress in the persistent-state game;

providing, via the gaming system, the first set of event indicators to the server before the point total equals the first threshold value in response to the determining that the first set of event indicators would cause the point total to be the given number of points away from the first threshold value;

after providing the first set of event indicators, accumulating, via the gaming system, second sets of event indicators according to a second accumulation setting, wherein each of the second sets of event indicators corresponds to a second portion of the eligible events, and wherein a first number of the eligible events in the first portion of the eligible events is more than a second number of eligible events in the second portion of the eligible events;

providing, via the gaming system, each of the second sets of event indicators to the server after each of the second sets is accumulated until determining that the point total reaches the first threshold value, wherein the second sets of event indicators are provided to the server more frequently than the first set of event indicators; and after determining that the point total reaches the first threshold value, accumulating, via the gaming system, additional event indicators according to the first accumulation setting.

2. The method of claim 1 further comprising:

receiving an indication from the server that the first level of progress has been attained; and providing an indicator for presentation via the wagering game machine, wherein the indicator is configured to specify that the first level is awarded.

3. The method of claim 1, wherein the server hosts one or more websites for presentation of the persistent-state game, wherein the gaming system and the server communicate via a communications network, and wherein the first set of event indicators and the second sets of event indicators are transmitted via the communications network.

4. The method of claim 1, wherein the first set of event indicators accumulates during the wagering game without being provided to the server while the point total is less than the given number of points from the first threshold value.

5. The method of claim 1, wherein the point total is indicated via a progress meter via the electronic display device.

6. The method of claim 1, wherein the eligible events correspond to one or more of bets for plays of the wagering game, bets amount for plays of the wagering game, win results for plays of the wagering game, loss results for plays of the wagering game, a number of spins of the wagering game, a number of game plays of the wagering game, and wagering game accomplishments attained in the wagering game.

7. The method of claim 1, wherein the accumulating the additional event indicators comprises:

accumulating a second set of event indicators, according to the first accumulation setting, without providing the second set of event indicators to the server until determining that the second set of event indicators would cause the point total to be within the certain number of points away from a second threshold value for a second of level of progress;

providing the second set of event indicators to the server after the determining that the second set of points would cause the point total to be within the certain number of points away from a second threshold value;

after providing the second set of event indicators to the server, accumulating third sets of event indicators according to the second accumulation setting; and providing each of the third sets of event indicators after each of the third sets is accumulated until determining that the point total reaches the second threshold value.

8. The method of claim 1 further comprising:

obtaining a value for the first accumulation setting from the server, wherein the value for the first accumulation setting corresponds to a game type of the wagering game, using the value for the first accumulation setting to determine the first number of the eligible events in the first portion of the eligible events;

after providing the first set of event indicators to the server, obtaining a value for the second accumulation setting from the server, wherein the value of the second accumulation setting corresponds to the game type of the wagering game; and using the value of the second accumulation setting to determine the second number of the eligible events, wherein the value of the second accumulation setting causes each of the second sets of event indicators to be provided to the server more frequently than the first set of event indicators is provided to the server.

9. One or more non-transitory, machine-readable storage media having instructions stored thereon, which when executed by a set of one or more processors causes the set of one or more processors to perform operations comprising:

accumulating a first set of points according to a first accumulation criterion, wherein the first set of points correspond to first events for a wagering game presented via a wagering game machine in a casino, wherein the first set of points is accumulated without providing the first set of points to the server, wherein the server is configured to control a persistent-state game separate from the wagering game, wherein each of the points represents an incremental degree of progress toward levels of progress in the persistent-state game, and wherein the server is configured to award a first of the levels when a point total for the persistent-state game reaches a first threshold value;

after accumulating the first set of points, determining that first set of points would cause the point total to be a given number of points away from the first threshold value;

providing the first set of points to the server before the point total equals the first threshold value in response to the determining that the first set of points would cause the point total to be the given number of points away from the first threshold value, wherein the server is configured to add the first set of points to the point total;

accumulating seconds sets of points according to a second accumulation criterion, wherein each of the second sets of points corresponds to a second set of events for the wagering game;

providing each of the second sets of points to the server in intervals after providing the first set of points until the point total reaches the first threshold value, wherein the server is configured to add the second sets of points to the point total, and wherein the second sets of points are provided to the server more frequently than the first set of points;

after the point total reaches the first threshold value, accumulating, according to the first accumulation criterion, a third set of points without providing the third set of points to the server until determining the third set of points would cause the point total to be within the certain number points away from a second threshold value for a second of the levels; and after providing the third set of points to the server, accumulating fourth sets of points according to the second accumulation criterion until the point total reaches the second threshold value.

10. The one or more non-transitory, machine-readable storage media of claim 9, wherein the first set of points accumulates during the wagering game without being provided to the server while the point total is less than the given number of points away from the first threshold value.

11. The one or more non-transitory, machine-readable storage media of claim 9, said operations further comprising:

receiving an indication from the server that the first of the levels has been awarded; and providing an indicator for presentation via the wagering game machine, wherein the indicator is configured to specify that the first of the levels is awarded.

12. The one or more non-transitory, machine-readable storage media of claim 9, wherein the server is configured to host one or more websites for presentation of the persistent-state game.

13. A gaming apparatus comprising:

at least one wagering game controller;

at least one electronic display device; and a gaming data filter configured to, via the at least one wagering game controller, present a wagering game in a casino via the at least one electronic display device, determine, for each wagering game event of the wagering game, whether the wagering game event is eligible for progress in a persistent-state game controlled by a server external to the casino, generate at least one point indicator for each wagering game event in the wagering game determined to be eligible for progress in the persistent-state game, wherein the server is configured to add at least one point to a point total for each point indicator received from the gaming apparatus, and wherein the server is configured to award game levels in the persistent state game when the point total reaches certain threshold values, determine the point total for the persistent-state game based on data provided by the server, determine a first of the threshold values closest to the point total based on data provided by the server, accumulate a first set of point indicators for a plurality of wagering game events for a time period without providing the first set of point indicators to the server, after accumulating the first set of point indicators, determine that a first set of points, which correspond and to the first set of point indicators, would cause the point total to be a given number of points away from the first of the threshold values, provide to the server the first set of point indicators before the point total equals the first of the threshold values and after determining that the first set of points would cause the point total to be the given number of points away from the first of the threshold values, after providing the first set of point indicators, accumulate additional sets of point indicators, provide, to the server, the additional sets of point indicators in timing intervals that are more frequent than the time period in which the first set of point indicators was accumulated until determining that the point total reaches the first of the threshold values, and terminate the providing of the additional sets of point indicators to the server after determining that the point total reaches the first of the threshold values.

14. The gaming apparatus of claim 13, wherein each of the additional sets of point indicators includes only a number of point indicators that corresponds to each eligible wagering game event that occurs after the first set of point indicators is provided, and wherein the gaming data filter is configured to, after providing the first set of point indicators, provide each of the additional sets after the each eligible wagering game event occurs without accumulating a plurality of the additional sets.

15. The gaming apparatus of claim 13, wherein the gaming data filter is configured to, via the at least one wagering game controller:

determine a first point gradation for attaining the first of the threshold values, wherein different point gradations are associated with different ones of the threshold values; and use the first point gradation to determine one of more of the time period in which to accumulate the first set of point indicators and the timing intervals for the additional sets of point indicators.

16. The gaming apparatus of claim 13, wherein the first set of point indicators includes a first number of point indicators, and wherein each of the additional sets includes a second number of point indicators less than the first number of point indicators.

17. The gaming apparatus of claim 13, wherein the gaming data filter is configured to, via the at least one wagering game controller, determine one or more of the time period and the timing intervals based on one or more of a total amount bet during the wagering game, a value of one or more game outcomes for the wagering game, a number of playing rounds played in the wagering game, a number of the wagering game events that occur in the wagering game, and a number of wagering game accomplishments attained in the wagering game.

18. The gaming apparatus of claim 13, wherein the gaming data filter is configured to, via the at least one wagering game controller, determine one or more of the time period and the timing intervals based on one or more of a value on a leaderboard, an activity performed amongst team members, an acquisition of a scavenger hunt item, and an achievement of a competitive group gaming activity.

19. A gaming system comprising:

one or more wagering game controllers configured to control one or more casino wagering games presented via a wagering game machine in a casino;

at least one memory unit configured to store instructions which, when executed by at least one of the one or more wagering game controllers, cause the gaming system to, send a first message to a server external to the casino, wherein the first message indicates a first game type for a first of the casino wagering games that is initiated via the wagering game machine, obtain first filter conditions from the server after sending the first message, wherein the first filter conditions are based on the first game type, wherein the first filter conditions specify events from the first of the casino wagering games that are eligible to increment a point total for a persistent-state game controlled by the server, and wherein the server is configured to award game levels in the persistent-state game when the point total reaches certain threshold values, accumulate a first set of data according to the first filter conditions, wherein the first set of data is not provided to the server until the first conditions are satisfied, and wherein the first set of data would cause the point total to be a given number of points away from a first of the threshold values, after the first set of the data is accumulated, provide to the server the first set of data, after providing the first set of data, obtain second filter conditions from the server based on the first game type, wherein the second conditions are required to be satisfied before providing additional data about the eligible events, wherein the second conditions are different from the first conditions, and wherein the second conditions cause the additional data to be provided to the server more frequently than the first set of data;

after obtaining the second filter conditions, accumulate one or more additional sets of data based on the second filter conditions, providing the one or more additional sets of data until the point total reaches the first of the threshold values, and reverting to accumulating data according to the first filter conditions after determining that the point total reaches the first of the threshold values.

20. The gaming system of claim 19, wherein the eligible events comprise one or more of wagering amounts, configurations of wagering game elements, reel-stop configurations, wagering game outcomes, card hand configurations, bonus game values, a number of plays in a wagering game, and a number of spins of a reel.

21. The gaming system of claim 19, wherein the first conditions comprise a first amount of time that is required to transpire before providing the first set of data to the server, and wherein the second conditions comprise a second amount of time that is required to transpire which is less than the first amount of time, and wherein the at least one memory unit is configured to store instructions which, when executed by at least one of the one or more wagering game controllers, cause the gaming system to accumulate the first set of data for the first amount of time before providing the first set of data to the server, and accumulate each of the one or more additional sets of data during each second amount of time before providing the each of the one or more additional sets to the server.

22. The gaming system of claim 19, wherein the first conditions comprise a first amount of eligible events that are required to occur in the at least one casino wagering game before providing the first set of data to the server, and wherein the second conditions comprise a second amount of eligible events that are required to occur which is less than the first amount of eligible events, and wherein the at least one memory unit is configured to store instructions which, when executed by at least one of the one or more wagering game controllers, cause the gaming system to accumulate the first set of data until the first amount of eligible events occur before providing the first set of data to the server, and accumulate each of the one or more additional sets of data for each occurrence of the second amount of eligible events before providing the each of the one or more additional sets to the server.

23. The gaming system of claim 19, wherein the at least one memory unit is configured to store instructions which, when executed by at least one of the one or more wagering game controllers, cause the gaming system to determine the point total for the persistent-state game based on data provided by the server, and determine the first of the threshold values closest to the point total based on data provided by the server.

24. The gaming system of claim 19, wherein the at least one memory unit is configured to store instructions which, when executed by at least one of the one or more wagering game controllers, cause the gaming system to:

initiate a second of the casino wagering games via the wagering game machine, wherein the second of the casino wagering games has a second game type different from the first game type;

send a second message to the server, wherein the second message indicates the second game type; and obtain additional filter conditions from the server for the second of the casino wagering games, wherein the additional filter conditions are based on the second game type.

* * * * *